(12) United States Patent
Laplane et al.

(10) Patent No.: US 12,025,968 B2
(45) Date of Patent: Jul. 2, 2024

(54) SYSTEMS AND METHODS FOR POSITIONING A SHIFTING PROFILE GEOMETRY

(71) Applicant: Schlumberger Technology Corporation, Sugar Land, TX (US)

(72) Inventors: Clement Laplane, Houston, TX (US); Benjamin Jean Yvon Durand, Sugar Land, TX (US); Thomas Mauchien, Sugar Land, TX (US); Amanda Olivio, Tomball, TX (US); Brandon Christa, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 30 days.

(21) Appl. No.: 17/997,662

(22) PCT Filed: May 3, 2021

(86) PCT No.: PCT/US2021/030492
§ 371 (c)(1),
(2) Date: Nov. 1, 2022

(87) PCT Pub. No.: WO2021/225967
PCT Pub. Date: Nov. 11, 2021

(65) Prior Publication Data
US 2023/0161316 A1 May 25, 2023

Related U.S. Application Data

(60) Provisional application No. 63/019,266, filed on May 2, 2020.

(51) Int. Cl.
*E21B 34/14* (2006.01)
*E21B 23/04* (2006.01)
(Continued)

(52) U.S. Cl.
CPC ............ *G05B 19/195* (2013.01); *E21B 23/04* (2013.01); *E21B 34/14* (2013.01); *E21B 47/09* (2013.01);
(Continued)

(58) Field of Classification Search
CPC ....... G05B 19/195; G05B 19/37; E21B 23/04; E21B 34/14; E21B 47/09; E21B 2200/06; E21B 41/00; G01B 21/14; G01B 21/20
See application file for complete search history.

(56) References Cited

U.S. PATENT DOCUMENTS

| 5,549,161 A | 8/1996 | Gomez et al. |
| 6,378,627 B1 | 4/2002 | Tubel |

(Continued)

FOREIGN PATENT DOCUMENTS

| CN | 208777937 | 4/2019 |
| EP | 2665893 A4 | 4/2019 |

(Continued)

OTHER PUBLICATIONS

International Preliminary Report on Patentability issued in International Patent application PCT/US2021/030492, dated Nov. 10, 2022, 7 pages.

(Continued)

*Primary Examiner* — Steven A MacDonald
(74) *Attorney, Agent, or Firm* — Jeffrey D. Frantz

(57) ABSTRACT

A method includes disposing an intervention service tool within a tubular. The intervention service tool includes an anchoring system, a shifting system, and a linear actuator system. The tubular includes a shifting profile geometry disposed within the tubular at a first location. The anchoring system, the shifting system, and/or the linear actuator system is actuated. Shifter system pressure, linear actuator system force/pressure, and displacement of the shifting system is (Continued)

measured. A known graph of the shifting profile geometry is compared to one or more of a measured pressure, a measured force, or a measured displacement. A position of a key disposed on the shifting system is determined relative to the shifting profile. The shifting profile geometry is engaged with the key based on the position of the key. The shifting profile geometry is positioned at a second location that is different from the first location.

20 Claims, 11 Drawing Sheets

(51) Int. Cl.
*E21B 47/09* (2012.01)
*G01B 21/14* (2006.01)
*G01B 21/20* (2006.01)
*G05B 19/19* (2006.01)
*G05B 19/37* (2006.01)

(52) U.S. Cl.
CPC ............ *G01B 21/14* (2013.01); *G01B 21/20* (2013.01); *E21B 2200/06* (2020.05); *G05B 19/37* (2013.01)

(56) References Cited

U.S. PATENT DOCUMENTS

| | | | |
|---|---|---|---|
| 8,220,555 B1 | 7/2012 | Wintill et al. | |
| 10,151,162 B2* | 12/2018 | Getzlaf | E21B 23/0412 |
| 2001/0027866 A1* | 10/2001 | George | E21B 23/0418 |
| | | | 166/50 |
| 2005/0072577 A1* | 4/2005 | Freeman | E21B 34/14 |
| | | | 166/66.4 |
| 2007/0251687 A1* | 11/2007 | Martinez | E21B 41/00 |
| | | | 166/250.1 |
| 2013/0014939 A1 | 1/2013 | Martinez et al. | |
| 2013/0118762 A1 | 5/2013 | Kellner | |
| 2014/0083680 A1 | 3/2014 | Brekke | |
| 2014/0083708 A1 | 3/2014 | Beck et al. | |
| 2014/0174761 A1 | 6/2014 | Spencer et al. | |
| 2016/0053562 A1 | 2/2016 | Frosell et al. | |
| 2016/0090803 A1* | 3/2016 | Getzlaf | E21B 23/02 |
| | | | 166/212 |
| 2017/0058644 A1 | 3/2017 | Andreychuk | |
| 2017/0175469 A1* | 6/2017 | Murphy | E21B 23/004 |
| 2017/0370189 A1* | 12/2017 | MacDougall | E21B 34/06 |
| 2018/0051529 A1 | 2/2018 | Braaten | |
| 2018/0171790 A1 | 6/2018 | Sharma et al. | |
| 2020/0040679 A1* | 2/2020 | Mauchien | E21B 23/01 |
| 2020/0173258 A1 | 6/2020 | MacDougall et al. | |
| 2021/0189820 A1* | 6/2021 | Baklanov | E21B 34/14 |

FOREIGN PATENT DOCUMENTS

| | | |
|---|---|---|
| WO | 2013074092 A1 | 5/2013 |
| WO | 2018004575 A2 | 1/2018 |
| WO | 2021225967 A1 | 11/2021 |

OTHER PUBLICATIONS

Office Action issued in U.S. Appl. No. 17/126,071 on Apr. 12, 2022, 9 pages.
Office Action issued in U.S. Appl. No. 18/045,292 dated Jan. 8, 2024, 58 pages.
Foucher et al., 2018, Wireline Tractor Advanced Restriction Navigation, SPE-189926-MS, (6 pages).
Bi-Directional Shifting Tool, downloaded on May 13, 2021, at http://www.hunting-intl.com/well-intervention-equipment/thru-tubing-technology/fishing-tools/bi-directional-shifting-tool (1 page).
European Extended Search Report issued in EP20215643.6, dated Apr. 21, 2021 (7 pages).
International Search Report and Written Opinion issued in International Patent application PCT/2021/030492 on Jun. 28, 2021, 9 pages.
International Search Report and Written Opinion issued in PCT Application No. PCT/US2022/048945 dated Mar. 10, 2023, 11 pages.
Extended Search Report issued in European Patent Application No. 21799493.18 dated Mar. 15, 2024, 5 pages.

* cited by examiner

SYSTEMS AND METHODS FOR POSITIONING A SHIFTING PROFILE GEOMETRY

CROSS-REFERENCE TO RELATED APPLICATION

The present document is a National Stage Entry of International Application No. PCT/US2021/030492, filed May 3, 2021, which is based on and claims priority to U.S. Provisional Application No. 63/019,266, filed May 2, 2020, which is incorporated herein by reference in its entirety.

BACKGROUND

This disclosure relates to systems and methods for performing mechanical operations within a wellbore and/or a casing using downhole mechanical service tools.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Many types of mechanical operations are performed in the course of maintaining and optimizing production from wells. Performing some of these operations involve application of axial forces to a downhole tool located downhole in a completion assembly. For example, isolation valves located in production tubing may be opened or closed by pushing or pulling an internal feature. In other examples, axial forces are used in the retrieval of a plug or a gas valve and in various fishing operations.

To perform these mechanical operations, engineering specifications of the downhole completion elements, understanding of the interaction between a given key on a tool relative to a shifting profile that is geometrically compatible with the completion element, and data from a Surface Integration Test (SIT) aid in supporting mechanical operations, such as manipulating well completion elements.

SUMMARY

Systems and methods for performing mechanical operations within a wellbore and/or a casing using downhole mechanical service tools are disclosed herein. In one example, a method includes disposing an intervention service tool within a tubular. The intervention service tool includes an anchoring system, a shifting system, and a linear actuator system. The tubular includes a shifting profile geometry disposed within the tubular at a first location. The method also includes positioning the intervention service tool such that the shifting system is above or below the shifting profile geometry. One or more of the anchoring system, the shifting system, and the linear actuator system is actuated. One or more of shifter system pressure, linear actuator system force, linear actuator system pressure, and displacement of the shifting system is measured. A known graph of the shifting profile geometry is compared to one or more of a measured shifter system pressure, a measured linear actuator system force, or a measured displacement. A position of a key disposed on the shifting system is determined relative to the shifting profile geometry. The shifting profile geometry is engaged with the key based on the position of the key. The shifting profile geometry is positioned at a second location that is different from the first location.

In another example, a method includes disposing an intervention service tool within a tubular. The intervention service tool includes an anchoring system, a shifting system, and a linear actuator system. The tubular includes a shifting profile geometry disposed within the tubular at a first location. The method also includes positioning the intervention service tool such that the shifting system is above or below the shifting profile geometry. One or more of the anchoring system, the shifting system, and the linear actuator system is actuated. One or more of shifter system pressure, linear actuator system force, linear actuator system pressure, and displacement of the shifting system is measured. A known graph of the shifting profile geometry is compared to one or more of a measured shifter system pressure, a measured actuator system force, or a measured displacement. A malfunction of the intervention service tool or a completion component is identified based on a result of the known graph to measured value comparison. A remedial operation is performed to correct the malfunction.

In a further example, a system includes an intervention service tool and a control unit. The control unit is coupled to the intervention service tool. The intervention service tool includes an anchoring system, a shifting system, and a linear actuator system. The control unit is configured to: 1) position the intervention service tool such that the shifting system is above or below a shifting profile geometry disposed in a tubular; 2) actuate one or more of the anchoring system, the shifting system, and the linear actuator system; 3) measure one or more of shifter system pressure, linear actuator system force, linear actuator system pressure, and displacement of the shifting system; 4) compare a known graph of the shifting profile geometry to one or more of a measured shifter system pressure, a measured linear actuator system force, or a measured displacement; 5) determine a position of a key disposed on the shifting system relative to the shifting profile geometry based on the known graph; 6) engage the shifting profile geometry with the key based on the position of the key; and 7) position the shifting profile geometry at a second location that is different from the first location.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
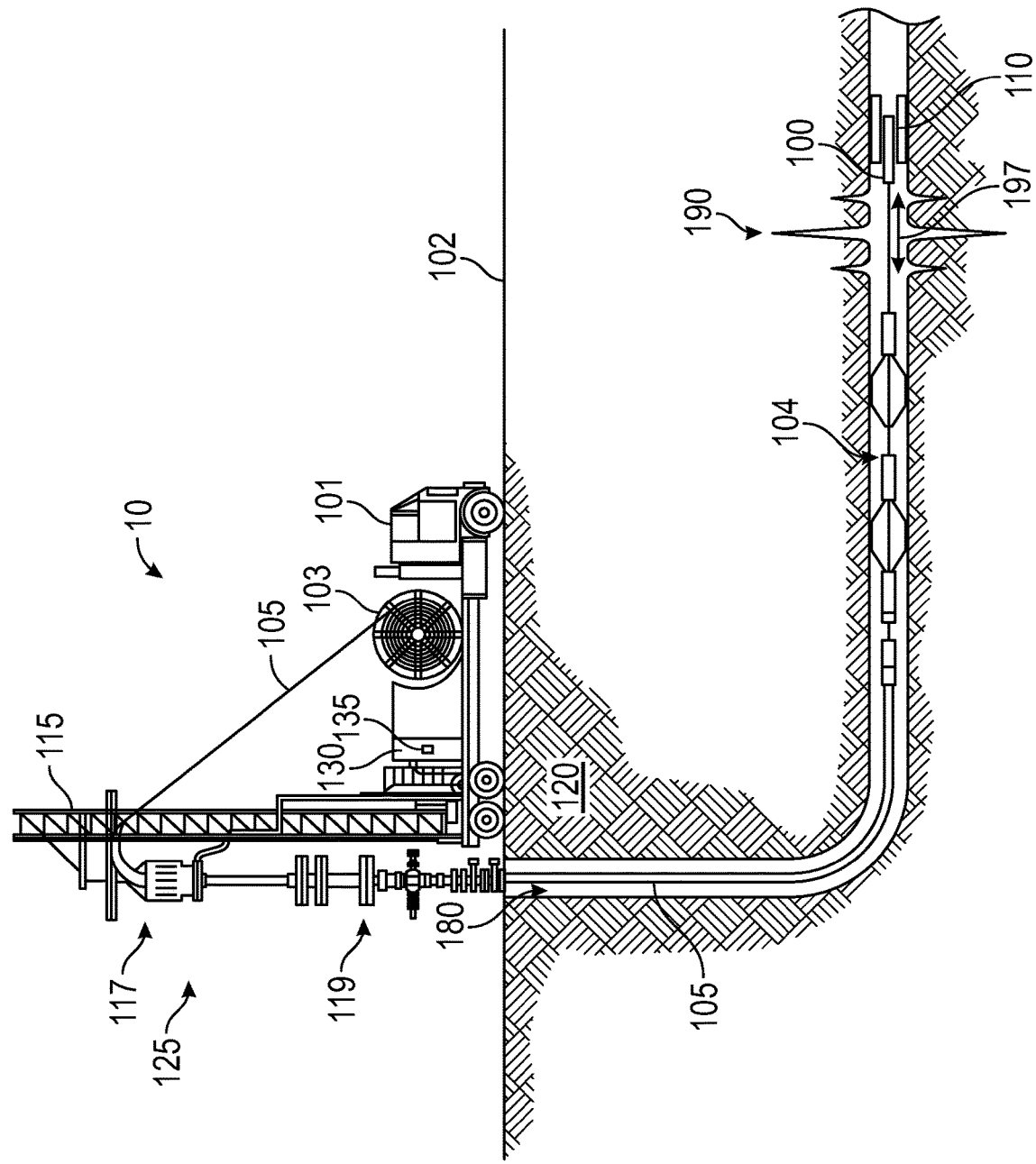
FIG. 1 shows an example system that includes a shifting tool disposed in a well in accordance with the present disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the terms "up" and "down," "upper" and "lower," "upwardly" and "downwardly," "upstream" and "downstream," "uphole" and "downhole," "above" and "below," "top" and "bottom," and other like terms indicating relative positions above or below a given point or element are used in this description to more clearly describe some embodiments of the disclosure. In this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. The recitation "based on" is intended to mean "based at least in part on." Therefore, if X is based on Y, X may be a function of Y and any number of other factors.

As used herein, the term "completion element" may include a sliding sleeve or a valve or the like. For example, a "sliding sleeve" may refer to a downhole completion component used to change fluid flow. Actuation of a sliding sleeve may enable or disable fluid communication between tubing and annulus. Sliding sleeves are also applied in Formation Isolation Valves, Flow Control Valves and other downhole completion equipment that can be manipulated using a wireline shifting tool. Formation isolation valves are valves that are opened and closed by pushing or pulling a sliding sleeve that is mechanically connected to the ball valve. Flow control valves are valves that are used to control flow, and can be opened to a partially open position. The manipulation of a sliding sleeve back and forth controls the percentage of opening of the flow control valve.

Over the life of the well, as certain zones begin to become depleted, produce water or require some form of remediation, an intervention may be performed. For example, where a zone of concern is outfitted with a sliding sleeve, an intervention with a shifting tool may take place whereby the tool is directed to the sleeve to manipulate a closure of the sleeve. As such, the zone may be closed off in a manner that allows continued production to come from more productive, less contaminant prone, adjacent zones.

Shifting tools are used to exercise or shift downhole valves and sliding sleeves by utilizing an anchoring system, a pulling or pushing load provided by a linear actuator, tractor system, or wireline cable, and a shifter tool for latching onto a completion shifting profile. Shifting tools are expected to be compatible with numerous sliding sleeve and valve types with different latching profiles, making the operation of the tool a bit different from job to job. However, once characterized, a particular type of completion equipment shifting operation should be very repeatable.

A wireline engineer is usually in charge of lowering the shifting tool into the wellbore and operating the shifting tool. This requires that the engineer be extensively trained (which increases the cost of operations), and even with proper training, shifting operations are complex and susceptible to human error. Implementations of the wireline shifting system disclosed herein include a normalized visualizer. The visualizer supports operation of the shifting tool to reduce reliance on a human operator, thereby reducing operational costs and improving operation outcomes. In various implementations of the wireline shifting system, the visualizer is disposed at the surface. In some implementations, a portion of the visualizer, e.g., a pattern comparison component, may be embedded in the shifting tool. Operations supported by the visualizer include seeking the location of the sleeve to be shifted. The seeking operation includes searching for and latching the shifting tool onto a shifting feature of a sleeve. The shifting operation includes moving the sleeve to a different position by pushing or pulling.

FIG. 1 shows an example system 10 that includes a shift tool in a well in accordance with the present disclosure. The well 180 traverses a formation 120 and extends into a horizontal section which includes a production region 190. Due to the non-vertical architecture of the well 180, tractor conveyance, provided by a tractor 104, may be utilized in addition to the wireline 105 for positioning the shift tool 100. The tractor 104 may be a wheeled or a reciprocating tractor or any other suitable conveyance mechanism known in the art. The shift tool 100 may be utilized in wells displaying a variety of different types of architectures and similarly conveyed through a host of different types of conveyances. While both wireline 105 and tractor 104 conveyances are depicted in FIG. 1, in other embodiments, one form of conveyance may be utilized in lieu of the other. For example, the shift tool 100 may be deployed via a wireline cable (with or without the tractor 104), via drill pipe or via a battery powered slickline embodiment.

Surface equipment 125 located at the oilfield 102 may include a wireline truck 101 accommodating a winch-operated wireline reel 103 and control unit 130 for directing the operation. Similarly, a mobile rig 115 is provided for supporting a conventional gooseneck injector 117 for receipt of the wireline 105. Thus, the wireline 105 may be driven through standard pressure control equipment 119, as it is advanced toward the production region 190. In embodiments where the shift tool 100 is deployed on a wireline cable, drill pipe, or slickline, suitable surface equipment will be utilized. In the illustrated example, the production region 190 may be producing water or some other contaminant or may be having some other adverse impact on operations.

Figure 2:
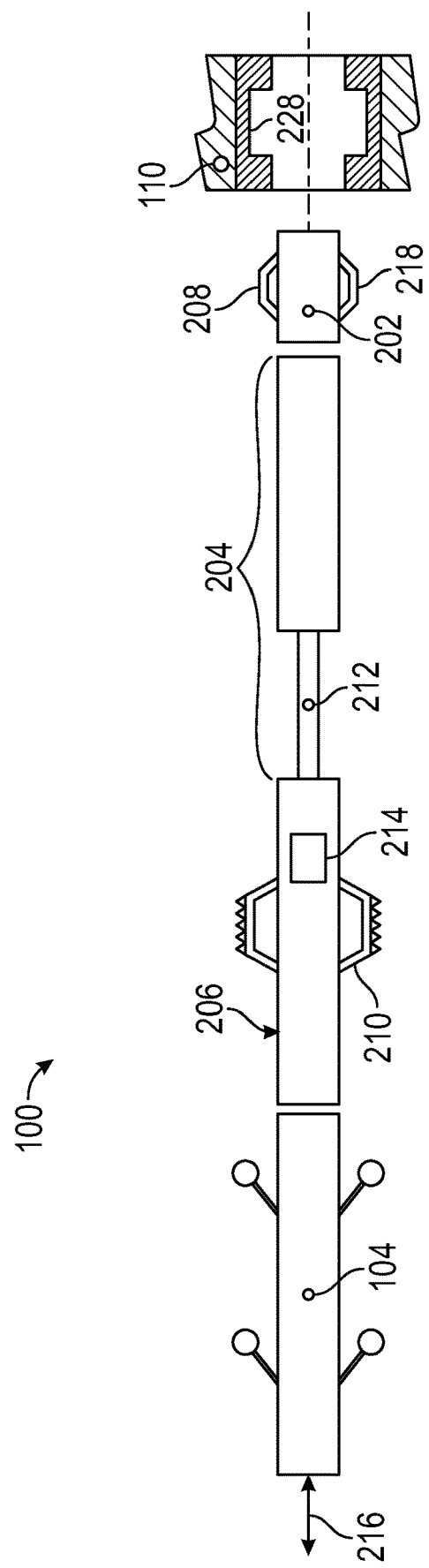
FIG. 2 shows an example shifting tool in accordance with the present disclosure.

The shift tool 100 may be delivered to the site of the sliding sleeve 110 to close off or open production from the production region 190 by shifting the sliding sleeve 110 in one or other direction illustrated by the arrow 197. FIG. 2 shows an example of the shift tool 100 in accordance with the present disclosure. The shift tool 100 includes a shifting system 202, a linear actuator 204, and an anchoring system 206. Some implementations of the shift tool 100 may also include the tractor 104. The shifting system 202 includes radially expansive shifting arms 208 that radially extend from the body of the shifting system 202 and may include a key 218 to engage the sliding sleeve 110. The anchoring system 206 includes radially expansive anchoring arms 210 (referred to generally as anchors 210) that radially extend from the body of the anchoring system 206 to engage casing or tubing disposed in the well 180. The linear actuator 204 provides axial force to push or pull (by extending or retracting rod 212) the shifting system 202. The anchoring arms 210 hold the anchoring system 206 in place while shifting arms 208 engage the sliding sleeve 110, and the shifting system 202 is pushed or pulled by the linear actuator 204 to reposition the sliding sleeve 110.

The shift tool 100 also includes a controller 214 that controls various functions of the shift tool 100, including: the extension and retraction of the anchoring arms 210, the extension and retraction of the shifting arms 208, the extension and retraction of the rod 212, and in some implementations of the shift tool 100, the operation of the tractor 104. The controller 214 may communicate with the control unit 130 and/or other surface control systems via the electrical conductors 216, which extend from the surface to the shift tool 100.

In some implementations of the shift tool 100, the controller 214 autonomously controls identification of the sliding sleeve 110, positioning of the shifting arms 208 in the sliding sleeve, actuation of the anchoring arms 210, and repositioning of the sliding sleeve 110 by extension/retraction of the linear actuator 204 and/or operation of the tractor 104. In some embodiments of the shift tool 100, the control unit 130 disposed at the surface receives sensor measurements from the shift tool 100 and autonomously controls seeking and shifting the sliding sleeve 110 via communication with the controller 214.

Figure 3A:
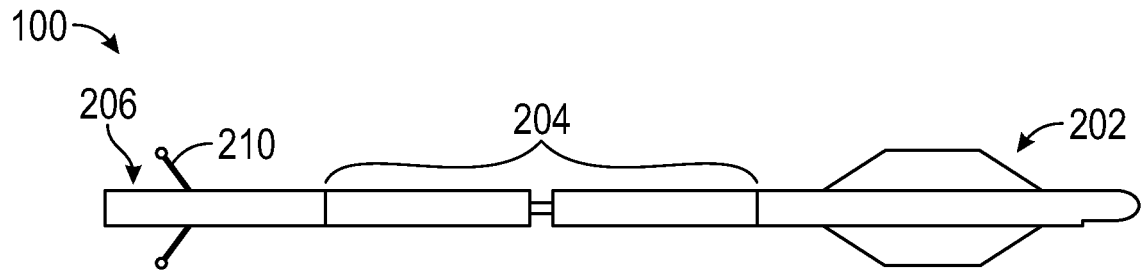
FIGS. 3A-3D shows an example shifting tool operation in accordance with the present disclosure.
Figure 3B:
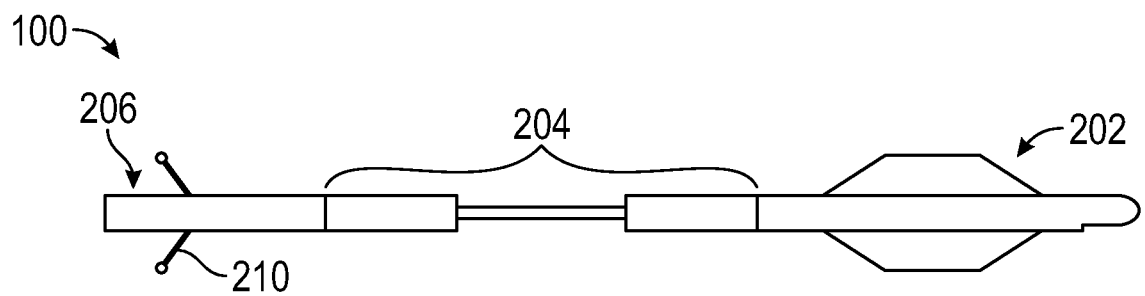
Figure 3C:
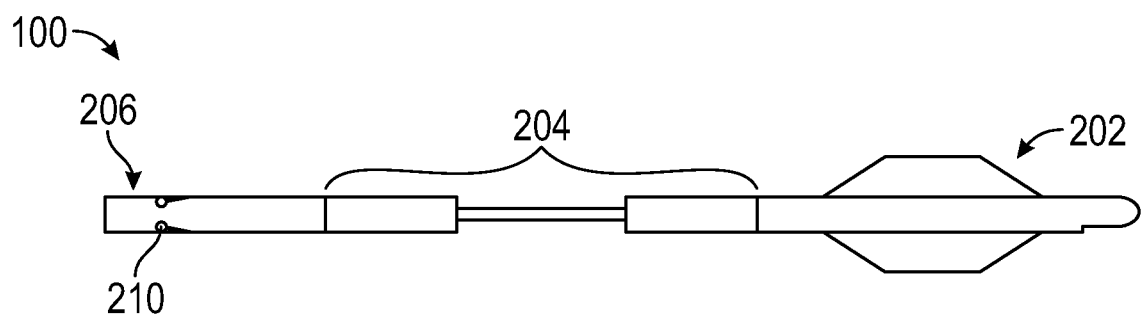
Figure 3D:
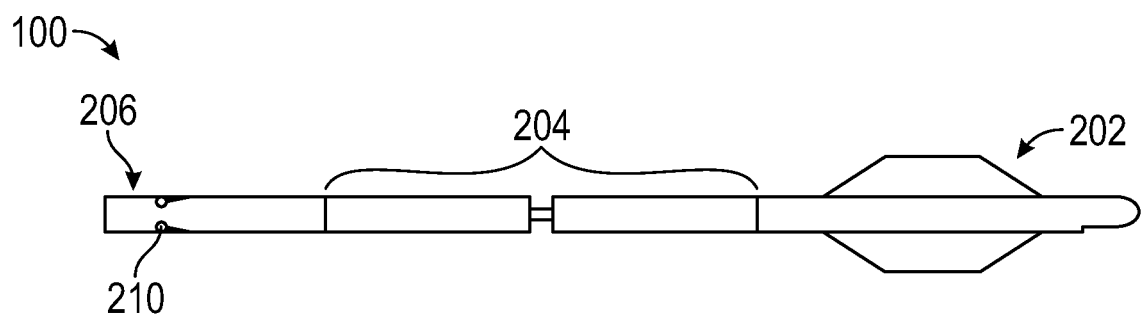

FIGS. 3A-3D show another example application of the shift tool 100 in various stages of operation in a well in accordance with the present disclosure. The shift tool 100 includes a shifting system 202, a linear actuator 204, and an anchoring system 206, but without a tractor. Instead, the shifting system 202 moves through inch worming sequences (inching operation) through the shifting operations. FIG. 3A shows the anchors 210 open and engaged, the linear actuator 204 retracted, and the shifting system 202 open and minimally engaged at a low pressure. FIG. 3B shows the anchors 210 open, the linear actuator 204 extended to move the shifting system 202, and the shifting system 202 open at a low pressure. FIG. 3C shows the anchors 210 closed, the linear actuator 204 extended, and the shifting system 202 open at a low pressure. FIG. 3D shows the anchors 210 closed, the linear actuator 204 retracted, and the shifting system 202 open at a low pressure to move the linear actuator 204 and anchoring system 206 the same distance that the shifting system 202 moved between FIGS. 3A and 3B.

A Surface Integration Test (SIT) may be performed prior to operations where information such as minimum linear actuator axial force to shift open or close is captured by exercising all the valves and completion elements in all states as described above.

Information from the SIT provides the ability to recognize the responses of tool sensors or signature to the downhole geometry or profile and/or condition of the completion elements. However, the interpretation of the SIT results may be affected by several factors including, but not limited to, differing personnel and experience levels, job stoppage for crew changes or tool parameter updates, and inadequate or improper signature data collection. In embodiments of the methods of the present disclosure, the shift tool 100 may be disposed in a tubular that includes a sliding sleeve 110. Interaction of the shift tool 100 with the sliding sleeve 110 (e.g., shifter system pressure, linear actuator force/pressure, shifting system displacement) are recorded to provide a graph (a shifting profile) of the shifting system.

Further, visualization of the interaction between a given key on a shift tool relative to a shifting profile of a completion element has traditionally been time based. However, the diagnostic is made using postprocessing and is not compatible with real time intervention workflow on costly deepwater environments and High Pressure/Temperature (HPHT) where tool exposure is a challenge.

In an implementation of the shift tool 100, a normalized visualizer 135 (FIG. 1) supports operation execution. The normalized visualizer 135 provides a high-resolution display of the shifting key displacement with resolution of 1.0 millimeter or less relative to the tool anchors and the completion. The visualizer combines the known specifications of completion components with the force and diameter related to the key engaging various portions of the completion components, or key pressure, to provide a visual signature or fingerprint (the shifting profile) of the completion components during all stages of engagement (e.g., a shifting procedure). For example, the normalized visualizer may provide a visual signature for a latch, a chamfer, a shear pin, or for indexing activation, equalization, and end of stroke for a sleeve mechanism.

The normalized visualizer is a powerful tool for graphically presenting SIT data for use during downhole operations in real time. The normalized visualizer shows pressure on the key along the entire shifting profile (i.e., displacement) including the starting and ending stroke as well as activation of the completion component. The normalized visualizer provides visual signature recognition that may guide the Field Engineer on the steps to perform and predict what response or pressure is expected for the completion component or be used as part of an automated shifting system.

Figure 4A:
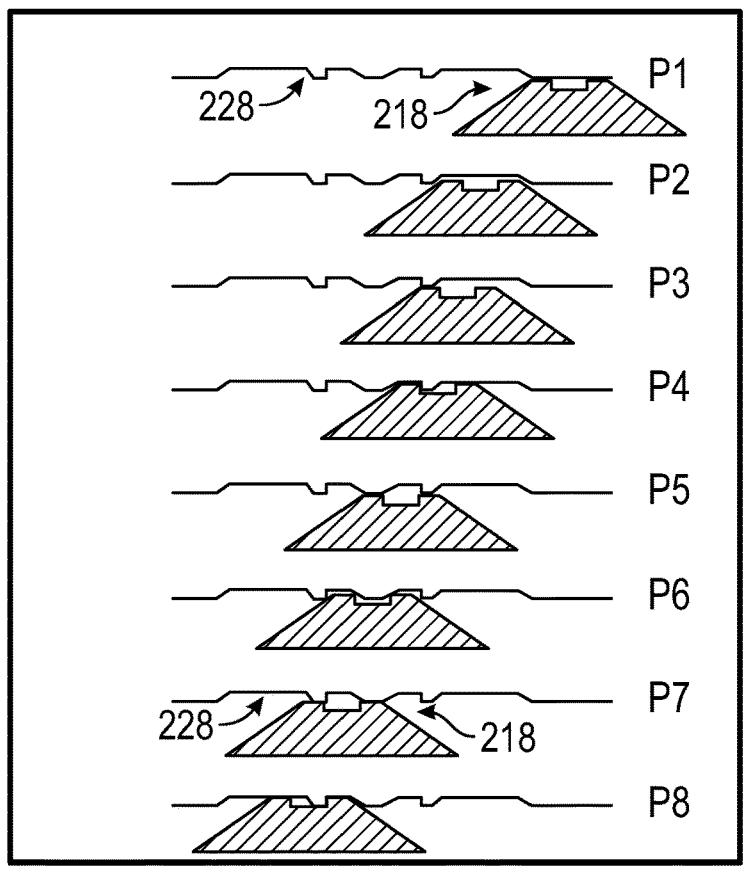
FIG. 4A shows various positions of a shifting tool in a shifting profile according to one or more embodiments of the present disclosure.
Figure 4B:
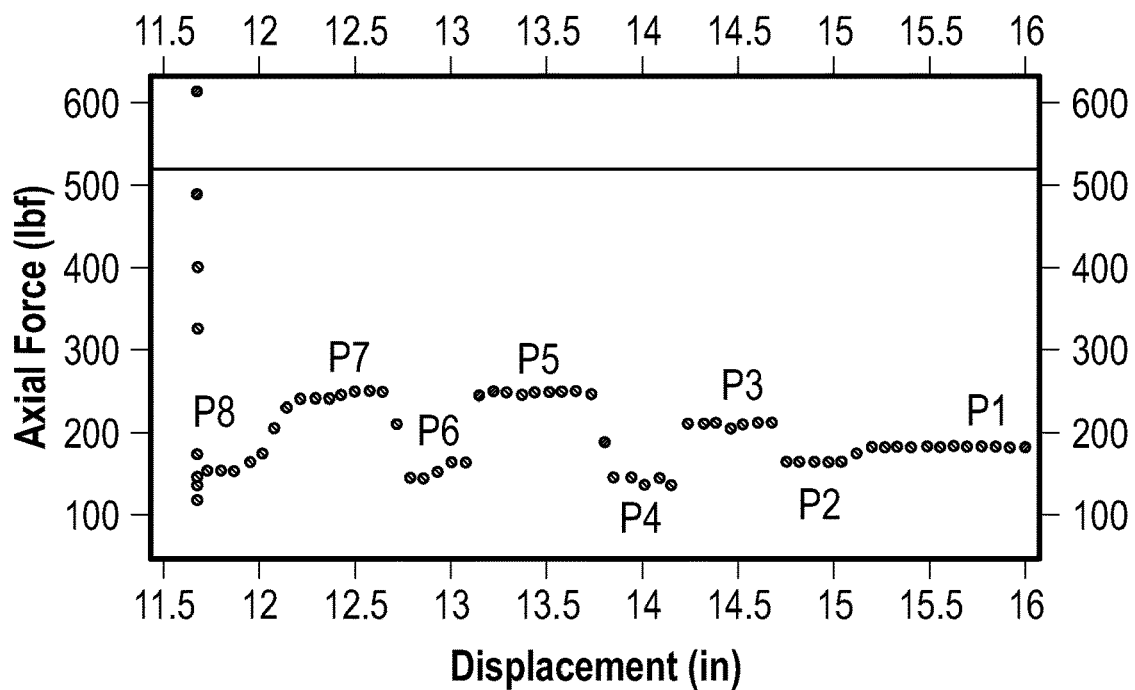
FIG. 4B shows an example completion profile measurement output of the shifting tool and profile shown in FIG. 4A according to one or more embodiments of the present disclosure.

FIG. 4A shows an example shifting profile 228 and the key 218 of the shifting system 202 in various positions P1-P8 as the key 218 progresses across the shifting profile 228. FIG. 4B is an example completion profile measurement output with data obtained from a SIT and correlates to the position of the key 218 in the profile 228 shown in FIG. 4A. FIG. 4B shows a graph of the axial force plotted over distance traveled or the displacement of the key 218 as the key progresses across the shifting profile 228. The resolution of the graph is 23 data points per inch (0.04 in | 1.1 mm). The plot shown in FIG. 4B represents a map of the geometry of the shifting profile 228 or a signature of the shifting profile. During the SIT, low pressures are used to move the key 218. P1 is the position of key 218 (FIG. 4A) before reaching the shifting profile 228, where a constant force or pressure is used on the key as shown at P1 in FIG. 4B. As the key expands outward and into an indentation of the profile 228, the pressure or force drops as is represented by P2 in FIGS. 4A and 4B. Similar drops in pressure or force occur as the key 218 expands outward into other indentations of the profile 228 shown at P4 and P6 in FIGS. 4A and 4B. The key 218 becomes squeezed or compressed back inward as it encounters a bump and comes out of an indentation resulting in an increase in pressure or force, shown by P3 in FIGS. 4A and 4B. Similar increases in pressure or force occur as the key 218 is compressed back by various bumps in the profile 228 shown at P5 and P7 in FIGS. 4A and 4B.

Figure 5A:
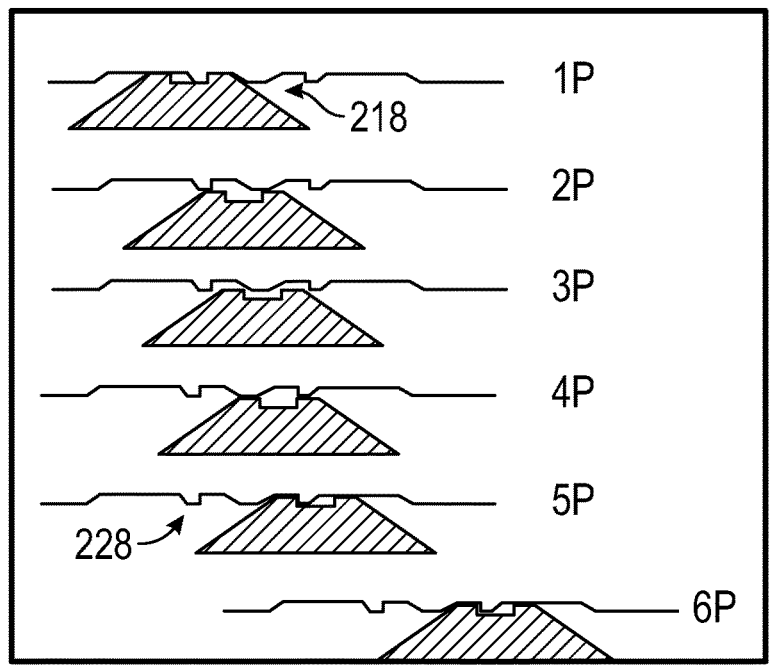
FIG. 5A shows various positions of a shifting tool in the shifting profile of FIG. 4A according to one or more embodiments of the present disclosure.
Figure 5B:
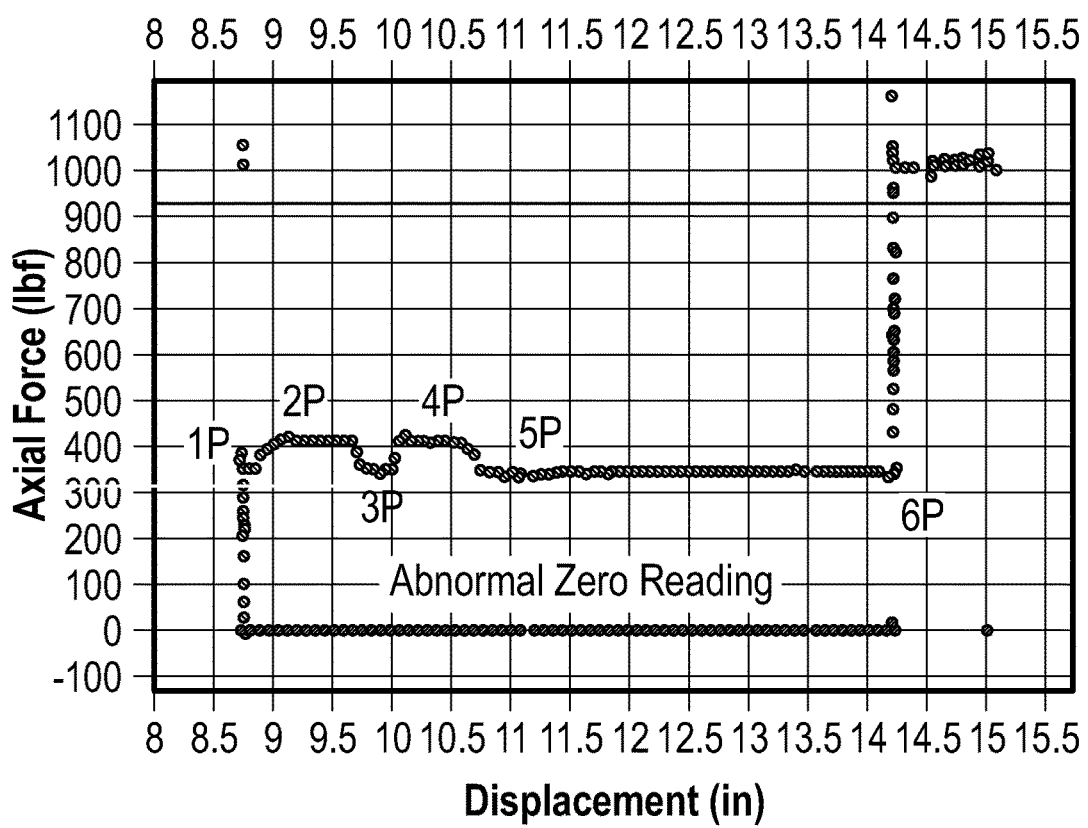
FIG. 5B shows an example completion profile measurement output of the shifting tool and profile shown in FIG. 5A according to one or more embodiments of the present disclosure.

While FIG. 4A showed the key 218 move from a right side or end of the profile 228 to a left side or end, the same data may be collected during a SIT with the key 218 moving from the left side or end of the profile 228 to the right side or end as shown in FIG. 5A. FIG. 5A shows shifting profile 228 and key 218 of the shifting system 202 in various positions 1P-6P as the key 218 progresses across the shifting profile 228. FIG. 5B shows data obtained from a SIT. For example, FIG. 5B shows a graph of the axial force plotted over distance traveled or the displacement of the key 218 as the key progresses across the shifting profile 228 with a resolution of 23 data points per inch (0.04 in 1.1 mm). The plot shown in FIG. 5B represents a map of the geometry of the shifting profile 228 or a signature of the shifting profile. 1P is the position of key 218 expanded outward and into an indentation of the profile 228, the pressure or force drops as is represented by 1P in FIGS. 5A and 5B. Similar drops in pressure or force occur as the key 218 expands outward into other indentations of the profile 228 shown at 3P and 5P in FIGS. 5A and 5B. The key 218 becomes squeezed or compressed back inward as it encounters a bump and comes out of an indentation resulting in an increase in pressure or force, shown by 2P in FIGS. 5A and 5B. A similar increase in pressure or force occurs as the key 218 is compressed back by another bump in the profile 228 shown at 4P in FIGS. 5A and 5B.

As demonstrated in FIGS. 4A and 4B showing manipulation of the shifting profile in a leftward direction and FIGS. 5A and 5B showing manipulation of the same shifting profile in a rightward direction, a map of the geometry of a shifting profile or a signature of the shifting profile may be achieved by moving an engaging key in either direction "uphole" to "downhole" and vice versa or left hand to right hand and vice versa. For example, the characteristics of P5 (FIGS. 4A, 4B) are similar to those of 2P (FIGS. 5A, 5B), P6 (FIGS. 4A, 4B) to 3P (FIGS. 5A, 5B), P7 (FIGS. 4A, 4B) to 4P (FIGS. 5A, 5B), and P8 (FIGS. 4A, 4B) to 5P (FIGS. 5A, 5B).

Figure 6:
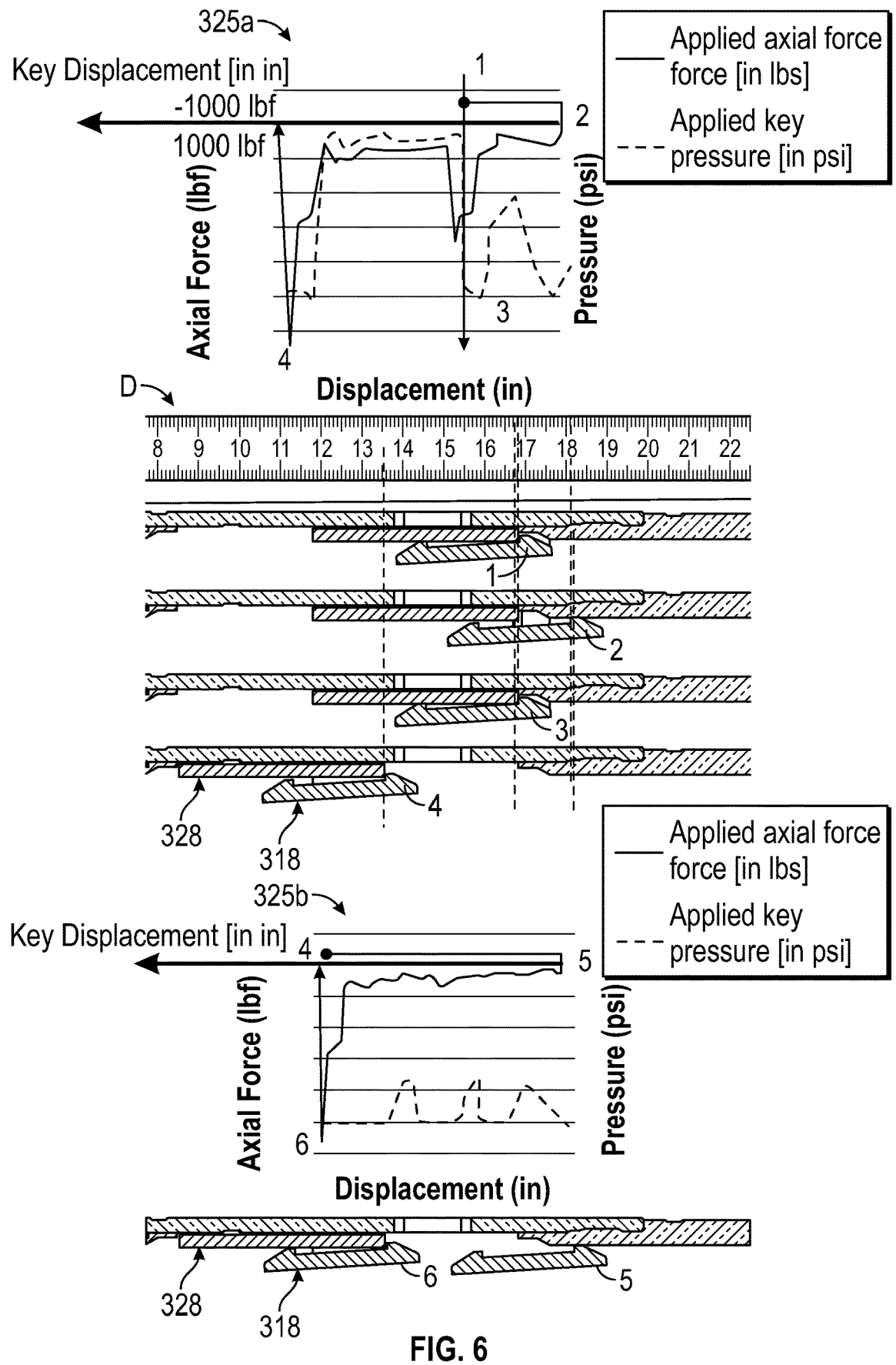
FIG. 6 shows axial force plotted over displacement of a key as the key engages a sliding sleeve according to one or more embodiments of the present disclosure.

FIG. 6 shows axial force plotted over distance traveled or the displacement of a key 318 as the key engages a sliding sleeve 328. The various stages of the key 318 and sliding sleeve 328 are shown in the bottom half of FIG. 6 below a displacement ruler D. In the operational stages illustrated in FIG. 6, with the key 318 in position 1, the location of the key 318 relative to an engagement feature of the sliding sleeve 328 may be initially unknown. Travel of the key 318 from position 1 to position 2, and from position 2 to position 3 may be undertaken to log the profile of the tubular inner surface and to confirm engagement of the key 318 with an engagement feature of the sliding sleeve 328. A drop in pressure applied to the key 318 indicates that the inner diameter of the tubular has increased, and that the key 318 has engaged the engagement feature of the sliding sleeve 328. The distance from position 3 to position 4 corresponds to the total travel distance of the sliding sleeve 328 and the key 318 engaged therewith. A repeat pass of the key 318 from position 5 to position 6 confirms the change in inner diameter of the tubular based on pressure applied to the key 318, and confirms the fully-shifted position of the sliding sleeve 328 based on an increase in axial force applied to the key 318.

Aligned with the displacement ruler D are graphs 325a and 325b showing the axial force and pressure (y-axis) plotted over displacement (x-axis) of the key 318. As shown by the displacement ruler D, there is a direct correlation between graphs 325a and 325b and actual displacement of the key 318. In comparison to the graphs 325a and 325b, a conventional log having time as the x-axis and displaying displacement axial force and key pressure may be difficult to read due to variation in shifting speed, time to enter parameters, crew change at wellsite, and other factors. Such a log may be multiple pages in length, which increases the difficulty in identifying a meaningful signature. The use of displacement, and removal of time from the log (as in the graphs 325a and 325b), allows for comparison of travel distance (e.g., in inches or other convenient units) with an engineering drawing or a previously acquired log, thereby allowing the engineer to immediately see stiffness, spacing, and/or latch abnormalities that are obscured by a conventional time-based log.

With data obtained from the SIT, the normalized visualizer may provide a data collection or library of known events and expected behaviors for the completion components in a wellbore in a visual format that may be used in real time during downhole operations such as manipulation of completion components.

Figure 7A:
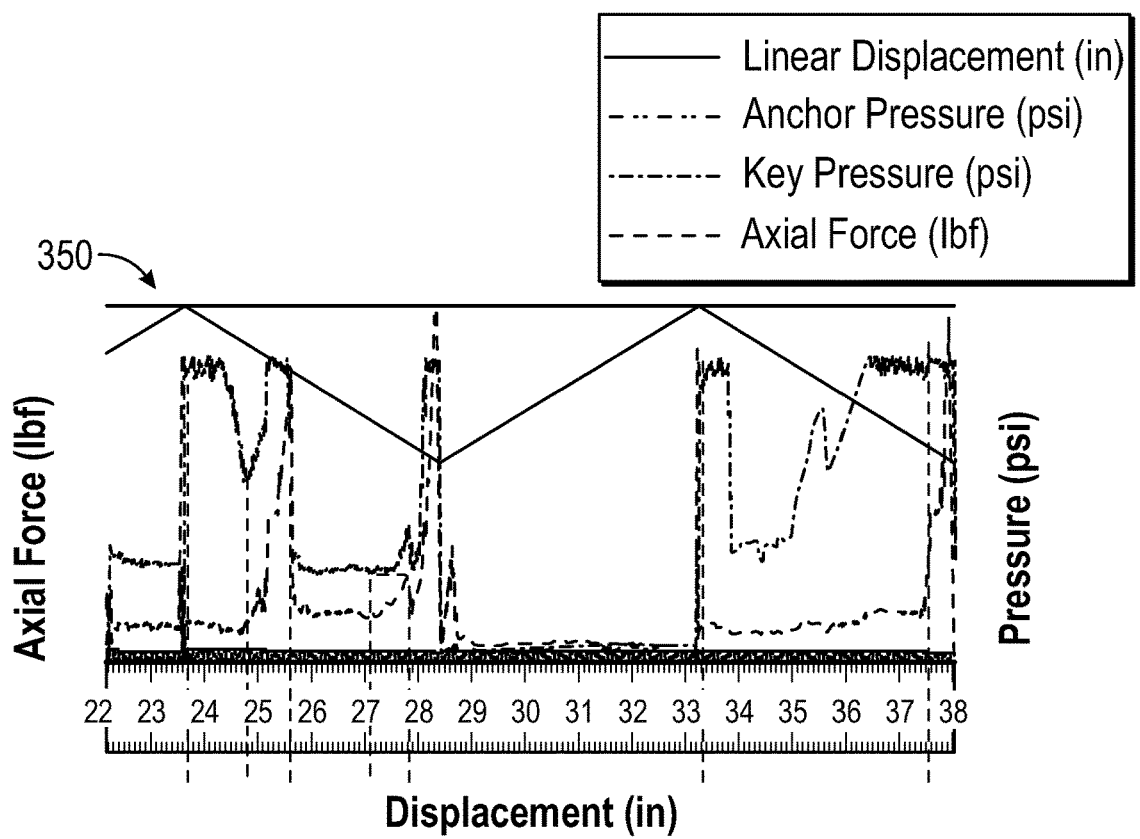
FIGS. 7A and 7B show normalized visualization output graphs for the key and sliding sleeve shown in FIG. 6 according to one or more embodiments of the present disclosure.

For example, FIG. 7A shows a normalized visualization output graph 350 of the axial force (y-axis) plotted over distance traveled or the displacement (x-axis) of a key as the key engages the sliding sleeve based on output from a SIT of a completion component similar to sliding sleeve 328 and key 318 shown in FIG. 6. The normalized visualization output graph 350 provides a visual signature or fingerprint of the key 318 during all stages of engagement with the sliding sleeve 328, and thus may guide the Field Engineer on the steps to perform and predict what response or pressure is expected during the manipulation of sliding sleeve 328 or be used to automatically manipulate the sliding sleeve (by the control unit 130).

Figure 7B:
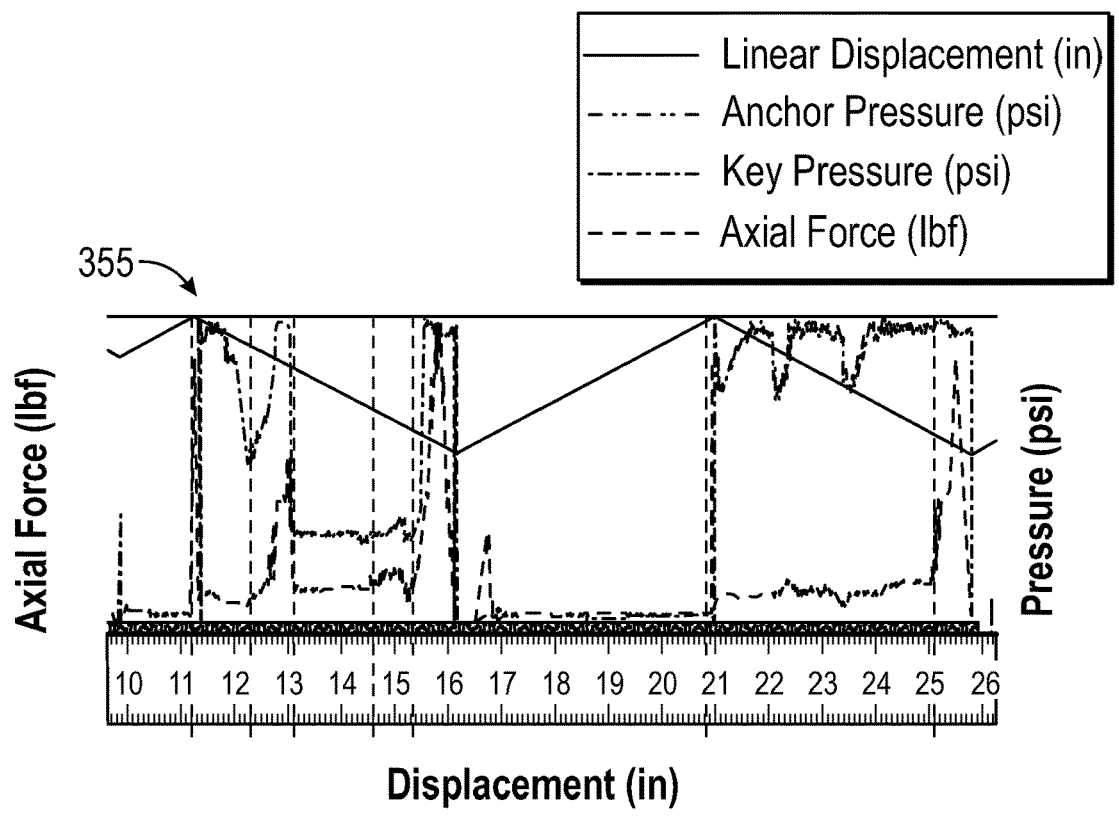

FIG. 7B shows a normalized visualization output graph 355 of actual axial forces plotted over actual distance traveled or the actual displacement of key 318 as the key engages the sliding sleeve 328 during manipulation of the sliding sleeve 328 with the key 318 at a depth of approximately 4,500 meters. The normalized visualization output graph 350 of the SIT accurately predicts the expected pressures during the sliding sleeve 328 manipulation as shown in the actual normalized visualization graph 355 during all stages of manipulation of the sliding sleeve 328.

Figure 8:
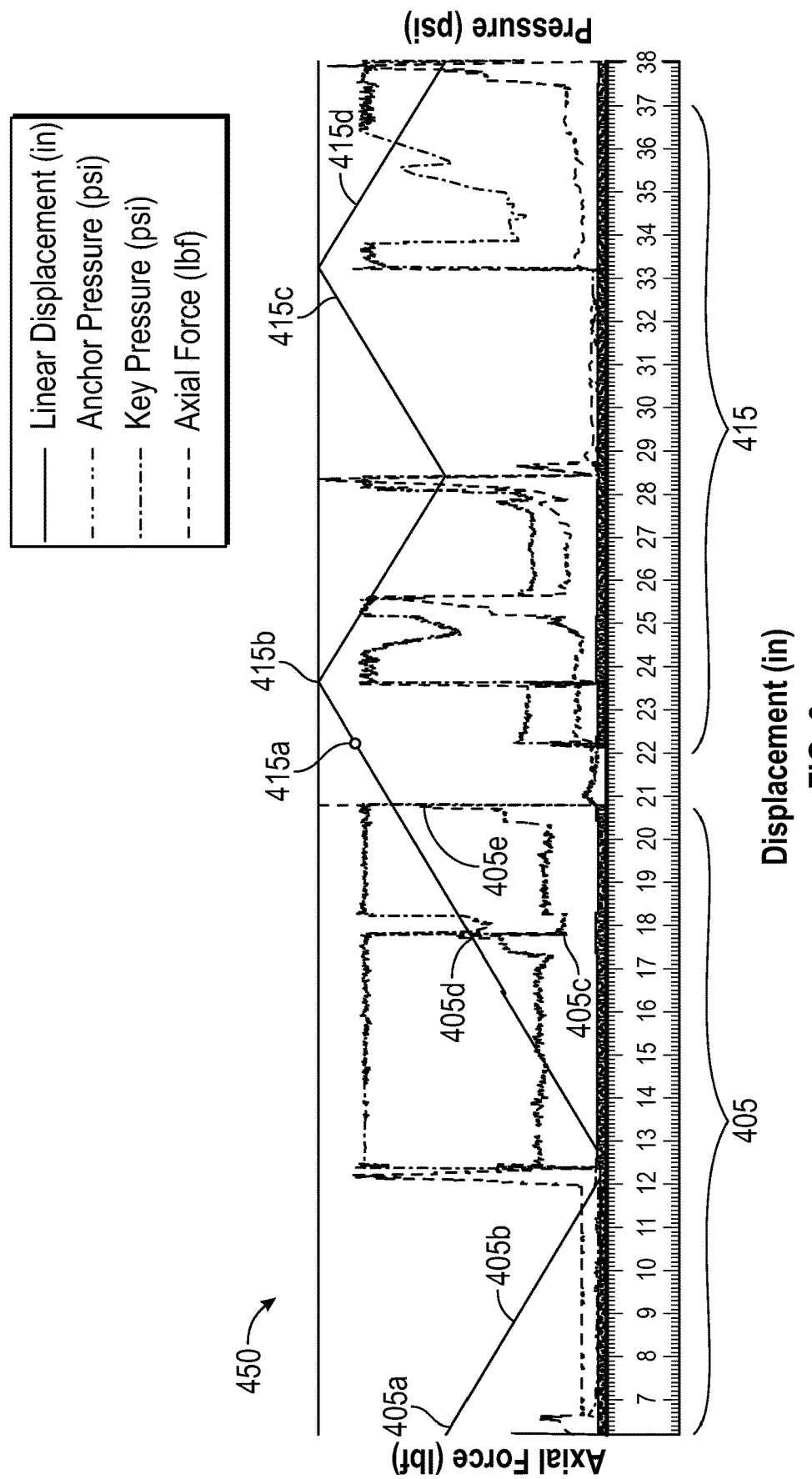
FIG. 8 shows a normalized visualization output graph for a shifting tool and sliding sleeve in closed and opened positions according to one or more embodiments of the present disclosure.

FIG. 8 shows a normalized visualization output graph 450 that may be derived from a SIT of a completion component (e.g., a sliding sleeve) or may represent actual axial forces plotted over actual distance traveled or the actual displacement of a key as the key engages the sliding sleeve during manipulation of the sliding sleeve in a wellbore. The normalized visualization output graph 450 provides the visual signature or fingerprint of the sliding sleeve during closing and opening the sleeve. During the closing of the sleeve (indicated by 405), normalized visualization output graph 450 identifies confirmation of various steps including, but not limited to: confirming latching of the key to a bottom end of the sleeve (indicated by 405a); positioning the key at the top end of the sleeve (indicated by 405b); engaging the top of the sleeve with the key (indicated by 405c); C-ring pop out (indicated by 405d); and reaching an end of the stroke (indicated by 405e). During the opening of the sleeve (indicated by 415), the normalized visualization output graph 450 identifies confirmation of various steps including, but not limited to: confirming latching of the key to a bottom end of the sleeve (indicated by 415a); retracting for a full stroke (indicated by 415b); retracting with no pressure to confirm the pass (indicated by 415c); and confirming the pass (indicated by 415d).

Figure 9:
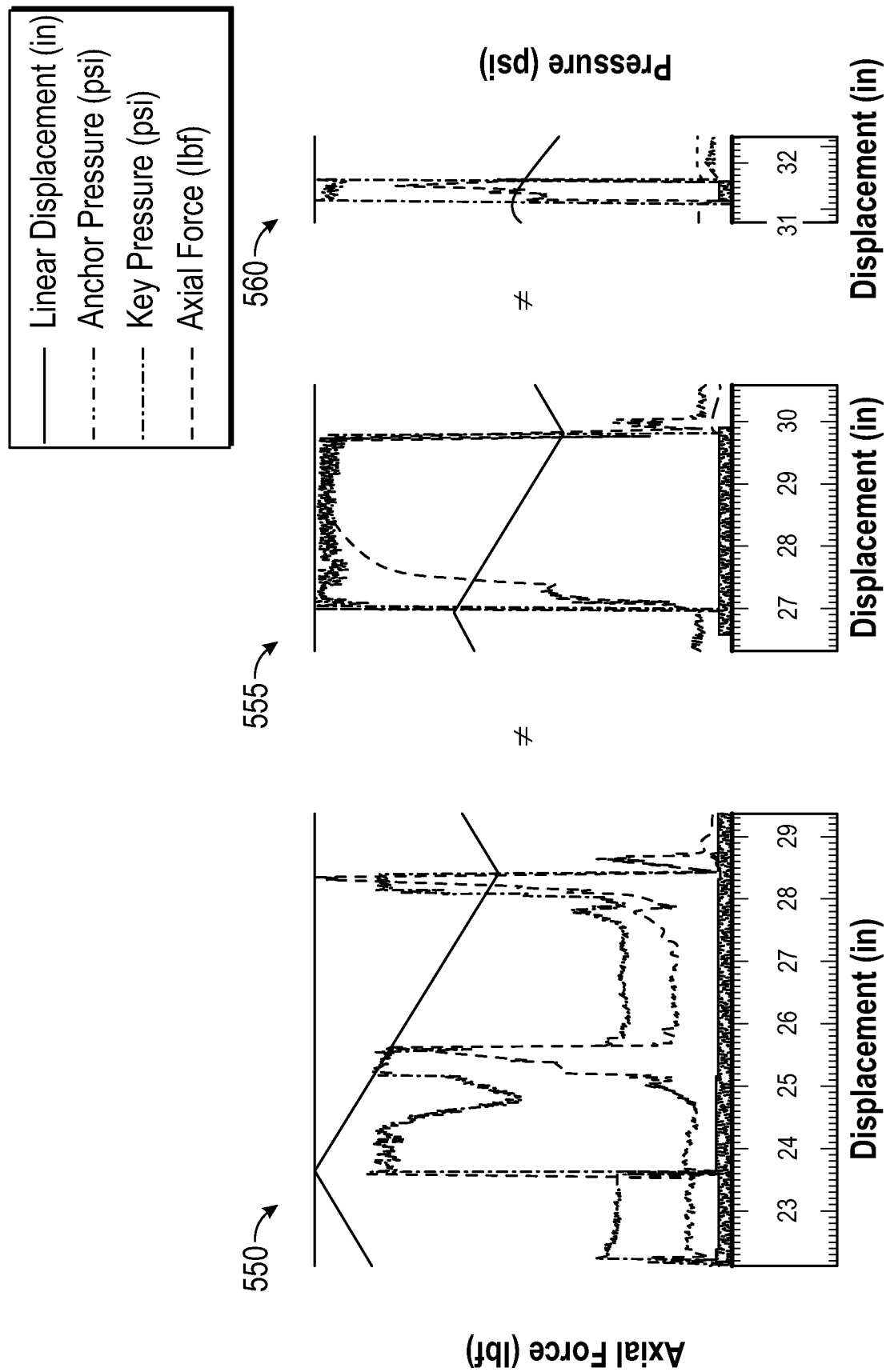
FIG. 9 shows portions of different normalized visualization output graphs of a key as the key engages a completion component according to one or more embodiments of the present disclosure.

FIG. 9 shows portions of different normalized visualization output graphs 550, 555, 560 of the axial force (y-axis) plotted over distance traveled or the displacement (x-axis) of a key as the key engages a completion component. The normalized visualization output graph 550 represents actual pressure and displacement data that matches a SIT-based visual signature or fingerprint of a sliding sleeve door during stages of engagement with a key (not shown). The normalized visualization output graph 555 represents actual pressure and displacement data that does not match the SIT-based visual signature or fingerprint of during stages of engagement of the key with the sliding sleeve door. A deviation from the normalized visualization output graph 550 may indicate an issue during manipulation of the sliding sleeve door such as slip of the anchors 210 (see FIGS. 2, 3A) possibly due to insufficient pressure. The addition of pressure to the anchoring system 206 may resolve the issue to manipulate the sleeve into the desired position, which is shown in the portion of normalized visualization output graph 560. The data collection or library of known events and expected behaviors for the completion components in a wellbore in a visual format may be expanded to further include slip events and other aberrations or malfunctions for future identification and guidance on the steps to perform and predict what response or pressure is expected for the aberration.

Figure 10:
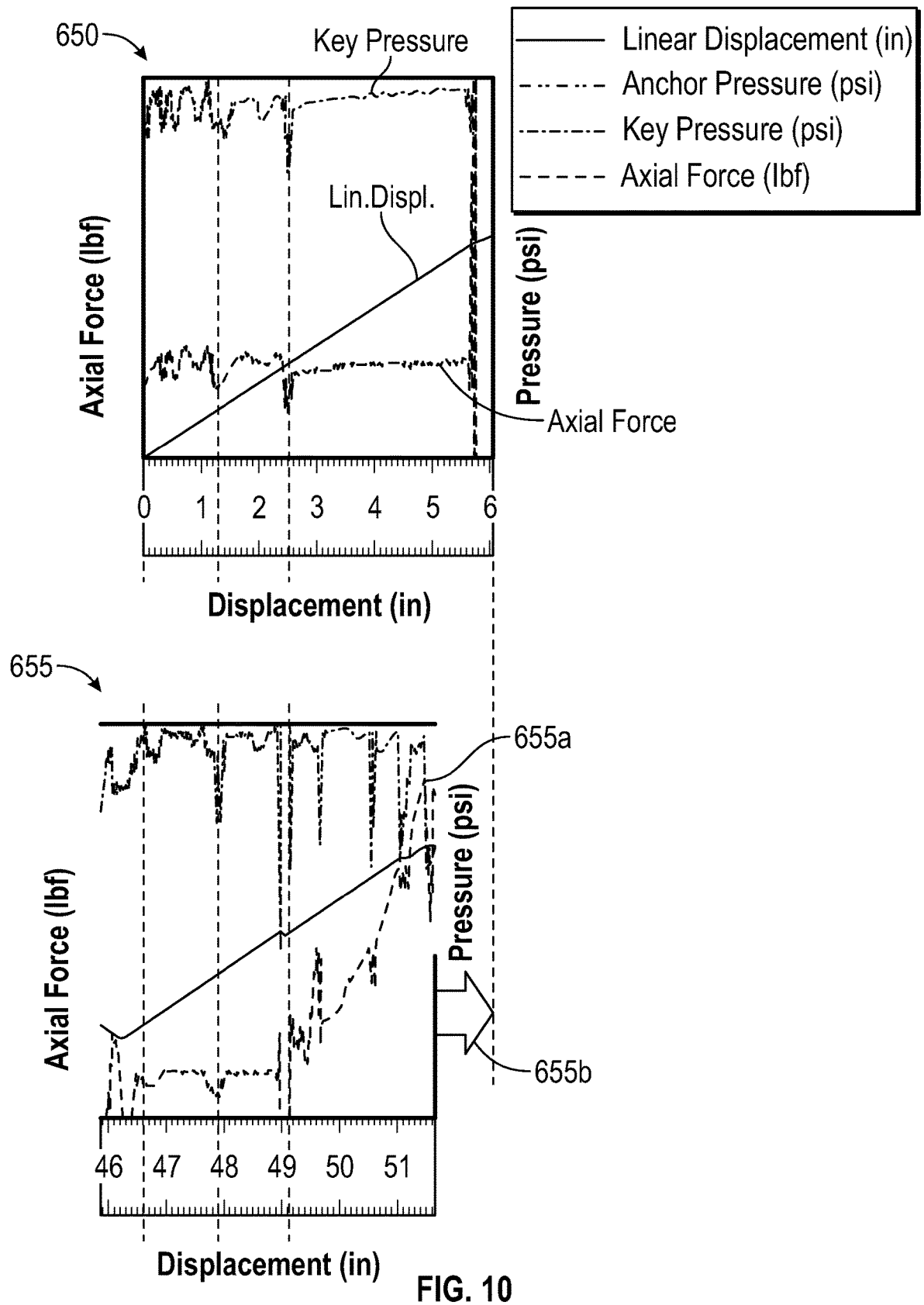
FIG. 10 shows portions of different normalized visualization output graphs of a key as the key engages a completion component according to one or more embodiments of the present disclosure.

As further shown in FIG. 10, the normalization visualizer may identify a malfunction during manipulation of a completion element such as valve malfunction during a shifting operation. FIG. 10 shows portions of different normalized visualization output graphs 650, 655 of the axial force (y-axis) plotted over distance traveled or the displacement (x-axis) of a key as the key engages a completion component. The normalized visualization output graph 650 represents actual pressure and displacement data that matches a SIT-based visual signature or fingerprint of a sliding sleeve for a valve during stages of engagement with a key (not shown). The normalized visualization output graph 655 represents actual pressure and displacement data that does not match the SIT-based visual signature or fingerprint during stages of engagement of the key with the sliding sleeve valve, and instead shows a force approximately five times the normal predicted force (indicated by 655a) without the last portion of displacement being achieved (indicated by 655b) to complete the shift (i.e., the manipulation of the sliding sleeve). A deviation from the normalized visualization output graph 650 may indicate an issue preventing manipulation of the sliding sleeve such as debris caught in the shifting profile that prevents the keys from properly and completely expanding outward and into the indentation of the shifting profile. Use of a debris removal tool may clear the debris blocking the key and resolve the issue to manipulate the sleeve into the desired position.

Figure 11:
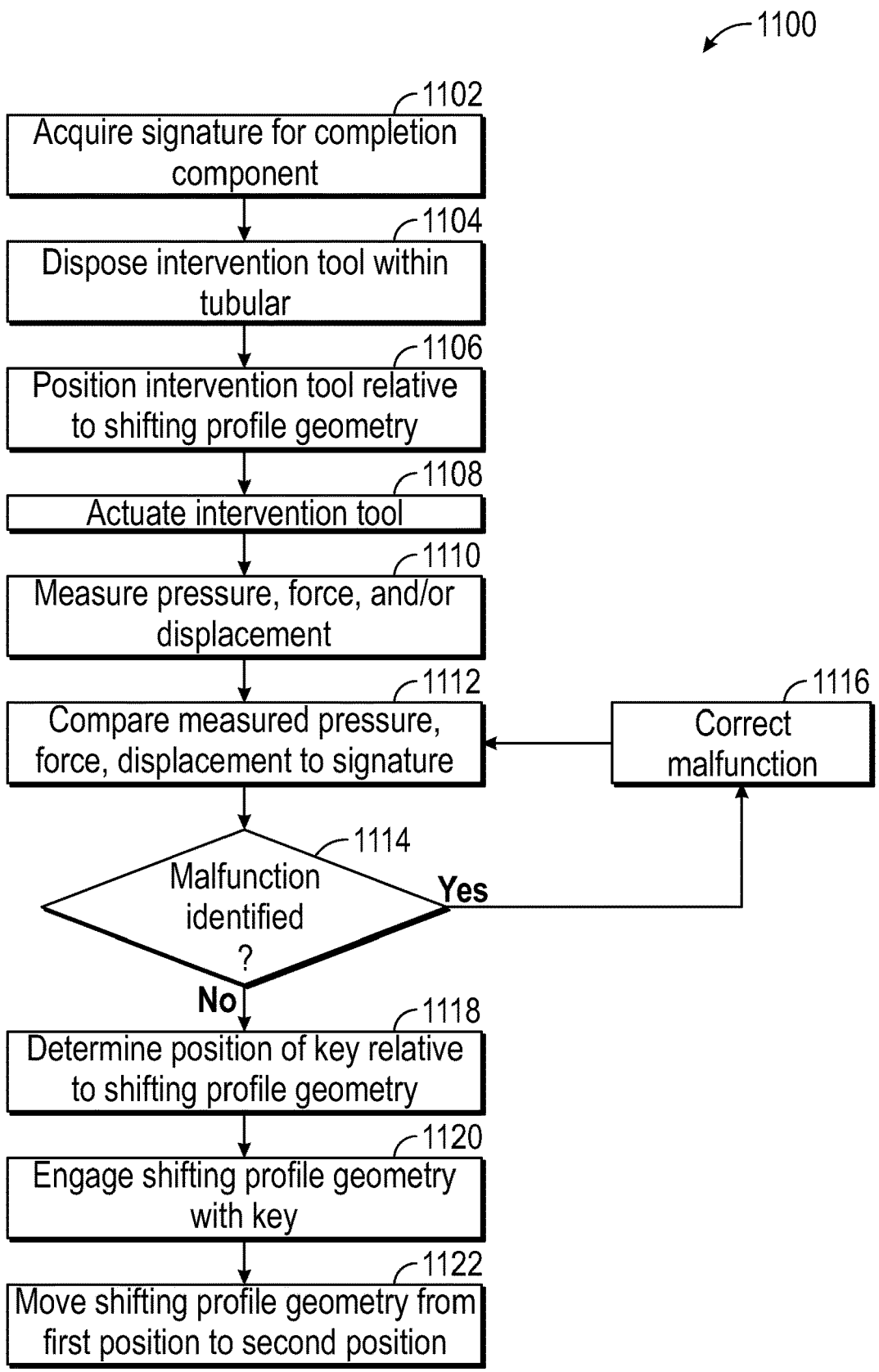
FIG. 11 shows a flow diagram for a method for operating an intervention service tool using normalized visualization in accordance with the present disclosure.

FIG. 11 shows a flow diagram for a method 1100 for operating an intervention service tool using normalized visualization in accordance with the present disclosure. Though depicted sequentially as a matter of convenience, at least some of the actions shown can be performed in a different order and/or performed in parallel. Additionally, some implementations may perform only some of the actions shown. Operations of the method 1100 may be performed by an implementation of the system 10. For example, the control unit 130 may be configured to control the shift tool 100, the winch operated wireline reel 103, the tractor 104, the normalized visualizer 135 and other components of the system 10 to perform the operations of the method 1100. The control unit 130 may include a computer having a processor and memory encoded with instructions for performing the operations of the method 1100.

In block 1102, a signature for a completion component disposed in a tubular is acquired. The completion component may be the sliding sleeve 110, and the signature may be a graph of a shifting profile geometry of the sliding sleeve. The signature may be acquired using a SIT in which the key 218 is moved across the shifting profile 228 and pressure, force, and displacement values are recorded. Alternatively, the signature may be acquired by executing a simulation of key 218 and shifting profile 228 interaction and recording pressure, force, and displacement values generated by the simulation.

In block 1104, an intervention service tool that includes the key 218 is disposed in a tubular, such as casing or tubing disposed in the well 180. The tubular includes the sliding sleeve 110. The intervention service tool may be the shift tool 100 and include the shifting system 202, the linear actuator 204, and the anchoring system 206. The intervention service tool may be disposed in the tubular by the winch operated wireline reel 103 controlled by the control unit 130.

In block 1106, the intervention service tool is positioned within the tubular relative to the sliding sleeve and the shifting profile geometry thereof. For example, the intervention service tool may be positioned above or below the shifting profile geometry within the tubular. Positioning of the intervention service tool may be provided by the winch operated wireline reel 103, the tractor 104, and/or inching operation of the intervention service tool.

In block 1108, one or more of the shifting system 202, linear actuator 204, or the anchoring system 206 is actuated. For example, the anchoring system 206 may be actuated to cause the anchoring arms 210 to engage a wall of the tubular. The shifting system 202 may be actuated to extend the shifting arms 208. The linear actuator 204 may be actuated to move the shifting system 202 relative to the anchoring system 206, and move the key 218 across the shifting profile 228 of the sliding sleeve 110. Actuation of the shifting system 202, linear actuator 204, or the anchoring system 206 may be controlled by the controller 214 and/or or the control unit 130. Actuation of the shifting system 202, linear actuator 204, or the anchoring system 206 may also be provided in conjunction operations of various blocks of the method 1100.

In block 1110, pressure, force, and/or displacement of the key 218 are measured as the key 218 moves across the shifting profile 228 of the sliding sleeve 110. The measurements may be transmitted to the control unit 130. The winch operated wireline reel 103, the tractor 104, and/or inching operation of the intervention service tool may be applied to move the key 218 across the shifting profile 228 of the sliding sleeve 110.

In block 1112, the measurements of block 1110 are compared to the signature acquired in block 1102. For example, in the control unit 130, the normalized visualizer 135 displays or presents (in graphical or other form) the measurements relative to the corresponding measurements of the signature for analysis by a user, the control unit 130, or other analysis system. In some implementations, the normalized visualizer 135 may analyze the measurements of block 1110 relative to the corresponding measurements of the signature.

In block 1114, comparison of the measurements of block 1110 to the signature acquired in block 1102 may determine that a malfunction of the intervention service tool or the sliding sleeve 110 has occurred. For example, if the measurements of block 1110 deviate by more than a predetermined amount from the corresponding measurements of the signature of block 1102, then a malfunction may have occurred. The nature of the malfunction may be determined by comparing the measurements of block 1110 to malfunction signatures stored in or provided to the control unit 130. The malfunction signatures may be similar to the signature of block 1102, but acquired when a specific defect or condition is present in the intervention service tool or the sliding sleeve 110.

If a malfunction is detected in block 1114, then a remedial operation may be performed in block 1116 to correct the malfunction. The particular action taken may be based on the identified malfunction. For example, if the identified malfunction indicates that debris caught in the shifting profile 228 prevents the key 218 from properly and completely expanding outward and into the indentation of the shifting profile 228, then a remedial operation may use a debris removal tool to clear the debris blocking the key 218.

In block 1118, the position of the key 218 relative to the shifting profile 228 is determined based on the comparison of block 1114.

Having determined the position of the key 218 relative to the shifting profile 228 in block 1118, the key 218 is moved to engage the shifting profile 228 in block 1120. For example, the key 218 is moved to a position of an engagement feature of the shifting profile 228, and the pressure applied to the shifting arms 208 is increased.

In block 1122, the key 218 has engaged the shifting profile 228, and the shifting system 202 is moved (e.g., by operation of the linear actuator 204), to move the shifting profile 228 from a first position to a second position. Moving the shifting profile 228 from the first position to the second position may, for example, open or close a valve. Movement of the key 218 and the shifting profile 228 to the second position may be verified by comparing the measurements of block 1110 to the signature acquired in block 1102. That is, the operations of blocks 1110 and 1112 may be repetitively performed in conjunction with the operations of blocks 1118, 1120, and 1122 to determine the location and state of the key 218 and the shifting profile 228.

An accurate visual representation with a high degree of resolution provided by the normalized visualizer allows any engineer or automated system to have a visual signature for each stage and/or expected event with explanations or meanings of each event available in real time during downhole operations. The normalized visualization output graphs may provide improved depth correlation through the key engaging expected downhole geometry or profiles with known parameters and locations and may be accurate within inches of a desired location or profile compared to standard gamma ray winch conveyed correlation that may only be accurate to within ten to twenty feet. The normalized visualizer may also assist in quality assurance and quality control of a downhole shifting job for example.

The normalized visualizer may support diagnostics as well as latching and shifting operations. Completion component signatures with unique axial shifting distances plotted against force can be defined theoretically (by simulation of key and sliding sleeve interaction) and/or by using a SIT. The normalized visualizer may support identification of a position of a completion element (e.g., a sliding sleeve) targeted for manipulation including fully opened, fully closed, and any intermediate position between fully opened and fully closed. The normalized visualizer may also support immediate recognition of an abnormal response such as, but not limited to, downhole valve malfunctioning, anchor slip, stuck sleeve, popped out key, and/or abnormal latch due to debris. The normalized visualizer may further enable confirmation of downhole completion component or element behavior including tool latching and anchoring through surface controlled downhole movement.

The normalized visualizer may also enable the measurement and confirmation of inner completion component profiles using direct shifter inner diameter measurements and/or shifter pressure changes and/or linear actuator force/pressure changes while operating the shifting system open and minimally engaged at a low pressure.

The normalized visualizer further enables bringing a key to an exact position of a shifting profile to support latching and shifting confirmation because shifting distance and force versus displacement behavior are known. The normalized visualizer also enables taking corrective action for off depth stroking because completion component geometries and expected correlated pressures or forces are known. The normalized visualizer further allows for a reduced expertise requirement for latching using inchworm or tractor conveyance by providing visual signatures for each stage and/or expected event with explanations or meanings of each the event available in real time during downhole operations.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method, comprising:
   disposing an intervention service tool within a tubular, wherein:
   the intervention service tool comprises an anchoring system, a shifting system, and a linear actuator system; and
   the tubular comprises a shifting profile geometry disposed within the tubular at a first location;

positioning the intervention service tool such that the shifting system is above or below the shifting profile geometry;
actuating one or more of the anchoring system, the shifting system, and the linear actuator system;
measuring one or more of shifter system pressure, linear actuator system force, linear actuator system pressure, and displacement of the shifting system;
comparing a known graph of the shifting profile geometry to one or more of a measured pressure, a measured force, or a measured displacement produced by the measuring;
determining a position of a key disposed on the shifting system relative to the shifting profile geometry based on a result of the comparing;
engaging the shifting profile geometry with the key based on the position of the key; and
positioning the shifting profile geometry at a second location that is different from the first location.

2. The method of claim 1, further comprising moving the key relative to the shifting profile geometry by:
actuating a winch disposed at a surface location; or
actuating a tractor coupled to the intervention service tool.

3. The method of claim 1, further comprising moving the key relative to the shifting profile geometry by actuating the anchoring system, the shifting system, and the linear actuator system to perform an inching operation.

4. The method of claim 1, further comprising, while the key is engaged with the shifting profile geometry:
moving the key to position the shifting profile geometry at the second location; and
determining the position of the key and the shifting profile geometry based on a result of the comparing.

5. The method of claim 4, further comprising determining that the shifting profile geometry is at the second location based on the result of the comparing.

6. The method of claim 1, further comprising identifying a malfunction in operation of the intervention service tool or a completion component based on a result of the comparing.

7. The method of claim 1, further comprising generating the known graph of the shifting profile geometry by simulating movement of the intervention service tool relative to the shifting profile geometry.

8. The method of claim 1, further comprising generating the known graph of the shifting profile geometry by moving an instance of the key across the shifting profile geometry.

9. A method, comprising:
disposing an intervention service tool within a tubular, wherein:
the intervention service tool comprises an anchoring system, a shifting system, and a linear actuator system; and
the tubular comprises a shifting profile geometry disposed within the tubular at a first location;
positioning the intervention service tool such that the shifting system is above or below the shifting profile geometry;
actuating one or more of the anchoring system, the shifting system, and the linear actuator system;
measuring one or more of shifter system pressure, linear actuator system force, linear actuator system pressure, and displacement of the shifting system;
comparing a known graph of the shifting profile geometry to one or more of a measured pressure, a measured force, or a measured displacement produced by the measuring;
identifying a malfunction of the intervention service tool or a completion component based on a result of the comparing; and
performing a remedial operation to correct the malfunction.

10. The method of claim 9, wherein identifying the malfunction comprises:
identifying a deviation of the measured pressure, the measured force, or the measured displacement from the known graph of the shifting profile geometry; and
comparing one or more of the measured pressure, the measured force, or the measured displacement to a graph of the malfunction.

11. The method of claim 10, wherein the remedial operation is selected based on the graph of the malfunction corresponding to the measured pressure, the measured force, or the measured displacement.

12. The method of claim 9, further comprising:
determining a position of a key disposed on the shifting system relative to the shifting profile geometry based on a result of the comparing;
engaging the shifting profile geometry with the key based on the position of the key; and
positioning the shifting profile geometry at a second location that is different from the first location.

13. The method of claim 9, wherein identifying the malfunction includes identifying a malfunction signature of at least one of the measured pressure, measured force, or measured displacement based on the comparing.

14. The method of claim 13, wherein identifying the malfunction signature further includes identifying that at least one of the measured pressure, measured force, or measured displacement has deviated a predetermined amount from a signature of a key disposed on the shifting system.

15. The method of claim 12, further comprising, while the key is engaged with the shifting profile geometry:
moving the key to position the shifting profile geometry at the second location;
determining the position of the key and the shifting profile geometry based on a result of the comparing.

16. The method of claim 15, further comprising determining that the shifting profile geometry is at the second location based on the result of the comparing.

17. The method of claim 1, further comprising generating the known graph of the shifting profile geometry by:
simulating movement of the intervention service tool relative to the shifting profile geometry; or
moving an instance of the key across the shifting profile geometry.

18. A system, comprising:
an intervention service tool including an anchoring system, a shifting system, and a linear actuator system; and
a control unit coupled to the intervention service tool, the control unit configured to:
position the intervention service tool such that the shifting system is above or below a shifting profile geometry disposed at a first location in a tubular;
actuate one or more of the anchoring system, the shifting system, and the linear actuator system;
measure one or more of shifter system pressure, linear actuator system force, linear actuator system pressure, and displacement of the shifting system;
compare a known graph of the shifting profile geometry to one or more of a measured pressure, a measured force, or a measured displacement;

determine a position of a key disposed on the shifting system relative to the shifting profile geometry based on the known graph;

engage the shifting profile geometry and the key based on the position of the key; and position the shifting profile geometry at a second location that is different from the first location.

19. The system of claim 18, wherein the control unit is configured to move the key relative to the shifting profile geometry by:

actuating a winch disposed at a surface location;

actuating a tractor coupled to the intervention service tool; or actuating the anchoring system, the shifting system, and the linear actuator system to perform an inching operation.

20. The system of claim 18, wherein the control unit is configured to:

while the key is engaged with the shifting profile geometry:

move the key to position the shifting profile geometry at the second location;

determine the position of the key and the shifting profile geometry based on a result of the comparing; and determine that the shifting profile geometry is at the second location based on the result of the comparing.

* * * * *